United States Patent
Fry

(10) Patent No.: US 12,165,386 B2
(45) Date of Patent: Dec. 10, 2024

(54) SYSTEMS AND METHODS FOR DETECTING A TRAVELLING OBJECT VORTEX

(71) Applicant: The Government of the United States of America, as represented by the Secretary of Homeland Security, Washington, DC (US)

(72) Inventor: Mark Fry, Marco Island, FL (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 18/422,997

(22) Filed: Jan. 25, 2024

(65) Prior Publication Data

US 2024/0193916 A1    Jun. 13, 2024

Related U.S. Application Data

(62) Division of application No. 17/987,677, filed on Nov. 15, 2022, now Pat. No. 11,922,676.

(Continued)

(51) Int. Cl.
*G06V 10/764* (2022.01)
*G06V 10/25* (2022.01)

(Continued)

(52) U.S. Cl.
CPC ............ *G06V 10/764* (2022.01); *G06V 10/25* (2022.01); *G06V 10/74* (2022.01); *G06V 10/761* (2022.01);

(Continued)

(58) Field of Classification Search
CPC .... G06V 10/764; G06V 10/761; G06V 20/52; G06V 10/25; G06V 10/74;
(Continued)

(56) References Cited

U.S. PATENT DOCUMENTS

| 5,537,641 A | 7/1996 | da Vitoria Lobo et al. |
| 6,736,148 B2 | 5/2004 | Davis et al. |

(Continued)

FOREIGN PATENT DOCUMENTS

| CN | 102902977 A | 1/2013 |
| CN | 110210568 A | 9/2019 |

(Continued)

OTHER PUBLICATIONS

Weijun, Pan, et al. "Deep learning for aircraft wake vortex identification." IOP Conference Series: Materials Science and Engineering. vol. 685. No. 1. IOP Publishing, 2019. (Year: 2019).*

(Continued)

*Primary Examiner* — Vu Le
*Assistant Examiner* — Tracy Mangialaschi
(74) *Attorney, Agent, or Firm* — Lavanya Ratnam; Robert W. Busby

(57) ABSTRACT

Systems and methods of detecting a vortex made by a travelling object is disclosed. Techniques include positioning a media collector to capture a visual media file of the vortex. In some configurations, a graphic recognition algorithm and vortex similarity engine are used to determine whether a visual media file captured by a media collector contains a vortex. In some configurations, a computer may trigger an alert if a travelling object vortex is not expected to be in the visual media file.

21 Claims, 18 Drawing Sheets

Related U.S. Application Data

(60) Provisional application No. 63/352,731, filed on Jun. 16, 2022.

(51) Int. Cl.
*G06V 10/74* (2022.01)
*G06V 10/77* (2022.01)
*G06V 20/52* (2022.01)
*G08B 21/18* (2006.01)
*G08G 5/00* (2006.01)

(52) U.S. Cl.
CPC .......... *G06V 10/7715* (2022.01); *G06V 20/52* (2022.01); *G08B 21/182* (2013.01); *G08G 5/0017* (2013.01); *G08G 5/003* (2013.01)

(58) Field of Classification Search
CPC .. G06V 10/7715; G06V 20/17; G08B 21/182; G08B 13/19613; G08G 5/003; G08G 5/0013; G08G 5/0021; G08G 5/0017
See application file for complete search history.

(56) References Cited

U.S. PATENT DOCUMENTS

| | | |
|---|---|---|
| 8,339,583 B2 | 12/2012 | Tillotson |
| 8,682,626 B2 | 3/2014 | Ionasec et al. |
| 9,758,257 B1 | 9/2017 | Frolov et al. |
| 9,760,805 B2 | 9/2017 | Wang et al. |
| 9,870,005 B2 | 1/2018 | Frolov et al. |
| 10,017,271 B2 | 7/2018 | Frolov et al. |
| 10,349,985 B1 | 7/2019 | Kriete et al. |
| 2017/0267371 A1 | 9/2017 | Frolov et al. |
| 2017/0315564 A1 | 11/2017 | Thomas et al. |

FOREIGN PATENT DOCUMENTS

| | | |
|---|---|---|
| CN | 111551959 A | 8/2020 |
| CN | 111736166 A | 10/2020 |

OTHER PUBLICATIONS

Yingjie, Duan, Pan Weijun, and Liu Siqi. "Research on Wake Turbulence Detection and Recognition Technology of Aircraft." 2021 IEEE 3rd International Conference on Civil Aviation Safety and Information Technology (ICCASIT). IEEE, 2021. (Year: 2021).*

Weijun, Pan, et.al., "Deep Learning for Aircraft Wake Vortex Identication," IOP Conference Series: Materials Science and Engineering, vol. 685, No. 1., 012015 IOP Publishing, (Year: 2019).

Yingjie, Duan, et al., "Research on Wake Turbulence Detection and Recognition Technology of Aircraft," 2021 IEEE 3rd International Conference on Civil Aviation Safety and Information Technology (ICCASIT). IEEE, 2021. (Year: 2021).

* cited by examiner

SYSTEMS AND METHODS FOR DETECTING A TRAVELLING OBJECT VORTEX

CROSS-REFERENCES

This application is a divisional of U.S. application Ser. No. 17/987,677 filed Nov. 15, 2022 which claims the benefit of priority to U.S. Provisional Application 63/352,731 filed Jun. 16, 2022.

STATEMENT OF GOVERNMENT INTEREST

The present invention was made by employees of the United States Department of Homeland Security in the performance of their official duties.

FIELD

The discussion below relates generally to systems and method for detecting a vortex generated by a travelling object.

BACKGROUND

U.S. Pat. No. 10,349,985 discloses a turbulence-free camera system and image enhancement technology, the contents of which are incorporated by reference in its entirety. This patent describes a camera system for application in long distance imaging such as satellite and aircraft to ground based imaging.

U.S. Pat. No. 8,339,583 discloses a system for detecting clear air turbulence, the contents of which are incorporated by reference in its entirety. The system compares a set of images to detect a change in refection of light due to turbulence. The system produces an indication of the area of turbulence in the scene.

U.S. Pat. No. 6,736,148 explains techniques and algorithms for image processing, the contents of which are incorporated by reference in its entirety.

U.S. Pat. No. 5,537,641 provides a method for physically-based modeling of three dimensional (3D) general fluid animation in computer graphics. For example, two dimensional (2D) Navier-Stokes equations are solved using a Computational Fluid Dynamics method. U.S. Pat. No. 5,537,641 is incorporated by reference in its entirety.

U.S. Pat. No. 8,6826,262 provides a method and system for comprehensive patient-specific modeling of the heart, the contents of which are incorporated by reference in its entirety. This patent discloses using a patient-specific anatomy as input to a 3D Navier-Stokes solver that derives realistic hemodynamics.

SUMMARY

Despite these improvements their remains an unmet need for a technology that detect a vortex generated by a travelling object. Aspects of the presently disclosed technology provide various systems and methods for detecting a vortex made by a travelling object. Some configurations include systems and methods for detecting UAS (unmanned aircraft systems) and/or UAV (unmanned aerial vehicles.)

For example, a method of detecting a travelling object travelling through the air is disclosed. The method may comprise positioning a media collector to capture a visual media file of a region of the air containing air molecules. The media collector may capture a visual media file of a vortex generated by the travelling object. A computer may receive the visual media file from the media collector. The computer may detect whether the visual media file has elements in common with a vortex generated by a travelling object.

DETAILED DESCRIPTION OF THE DRAWINGS

Figure 1A:
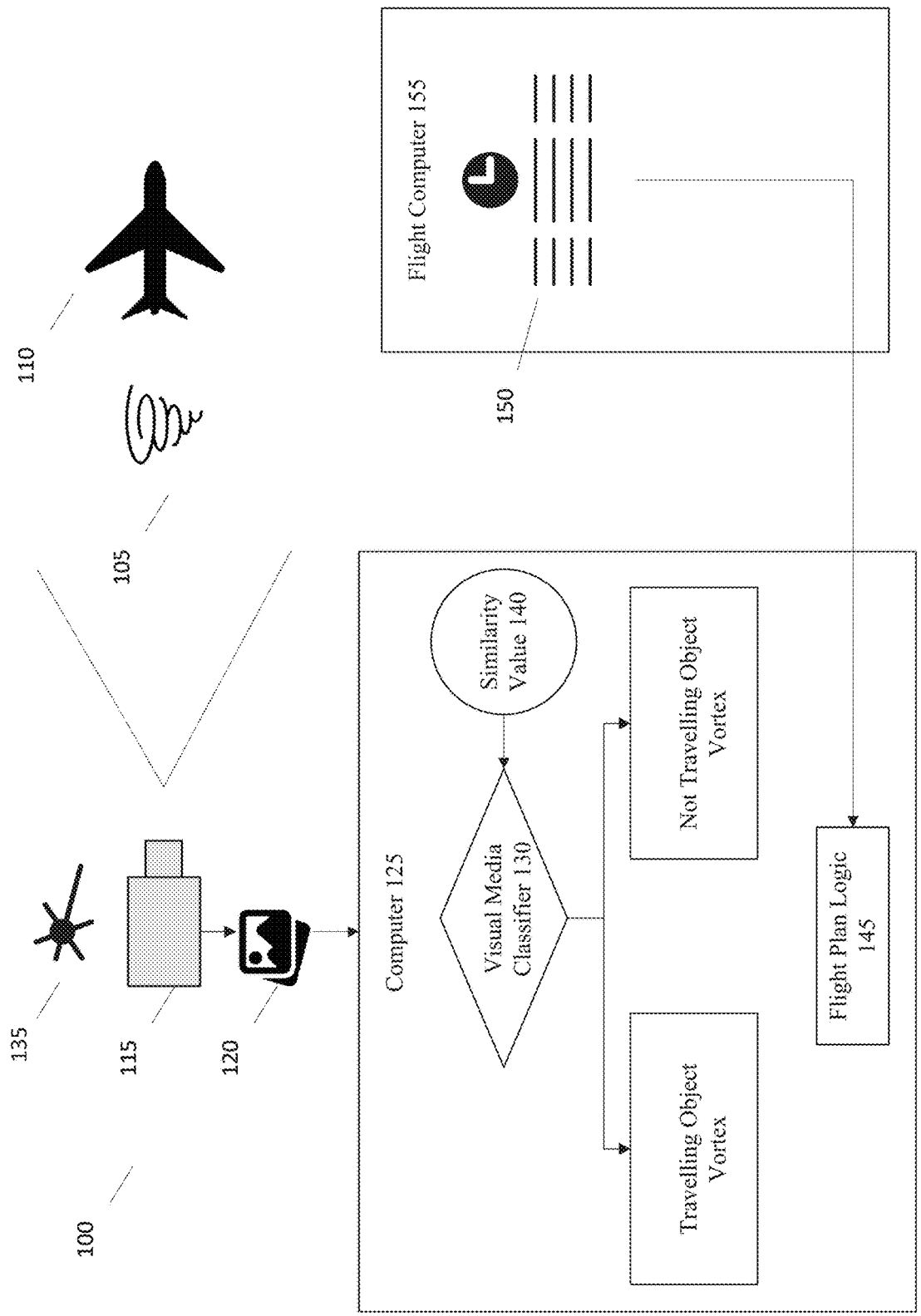
FIG. 1A depicts a schematic diagram of a visual media classifier and flight plan logic.

FIG. 1A depicts a schematic diagram for a system 100 for detecting a vortex 105 made by a travelling object 110. The system may comprise a media collector 115 configured to capture a region of the air containing air molecules. The media collector may be configured to capture a visual media file 120 of a vortex generated by the travelling object. The system may include a computer 125 configured to receive a visual media file from the media collector.

The travelling object may be a fixed wing airplane, helicopter, missile, projectiles, glider, etc. When the travelling object is travelling through the air, it may be called an airborne object. Some configurations of the invention can detect vortices made by nonairborne travelling objects, e.g. objects travelling on the ground, in the sea, underwater, underground, etc. Discrete examples of nonairborne travelling objects may include vehicles, cars, ships, drills, submarines, etc.

A vortex may be a change in density of the air or a compression of air molecules in the air. A vortex may be generated by an airborne object flying through the air. A vortex may be generated by wings, propeller, fuselage, and other surface pushing a medium (like air or water) out of the way—generating a temporary change in density of that medium. A vortex may be created in other mediums as well such as water. Travelling objects like a boat or submarine may create a vortex. In some configurations, the propeller of the aircraft or travelling object generates a vortex. The vortex may trail the travelling object. The length of a vortex may be much longer than the length of the travelling object. Radar-based technologies might be useful for detecting the travelling object in some cases, but ineffective at detecting a vortex.

Figure 1B:
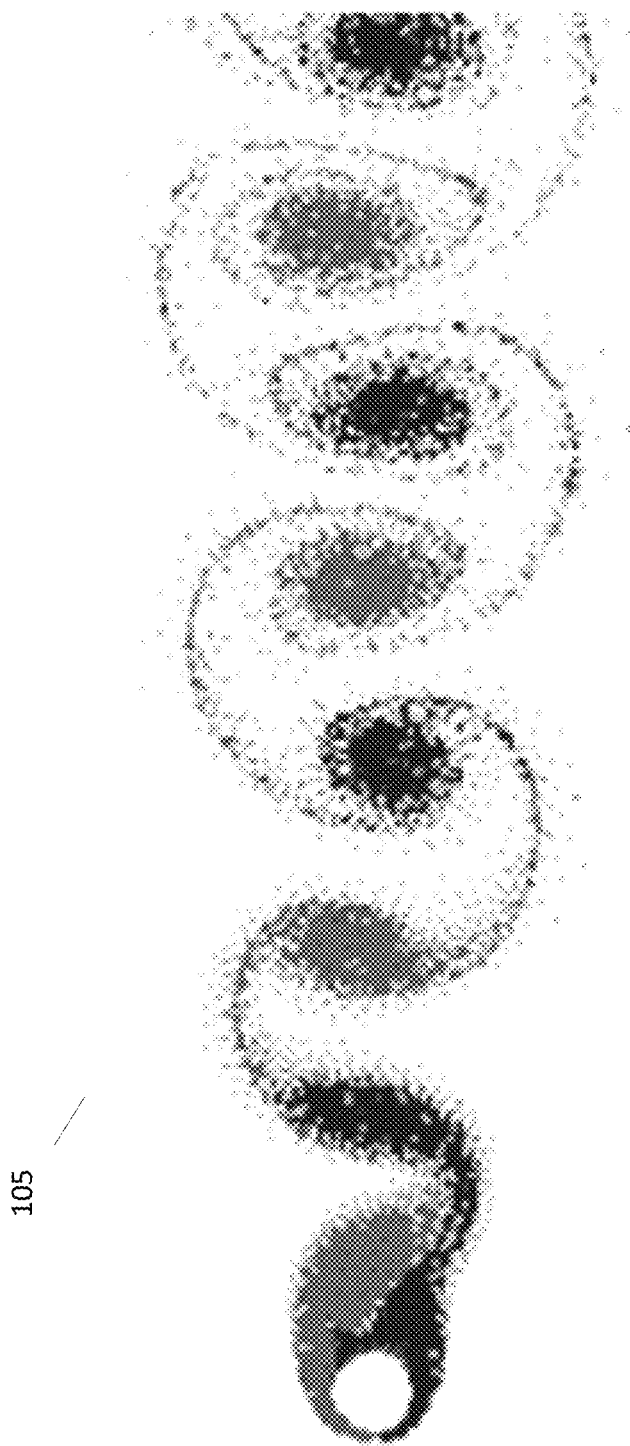
FIG. 1B depicts a cross-sectional view of a vortex generated by an airborne object.

FIG. 1B shows a cross-section view of what a vortex might look like as generated by a propeller-based aircraft.

Figure 1C:
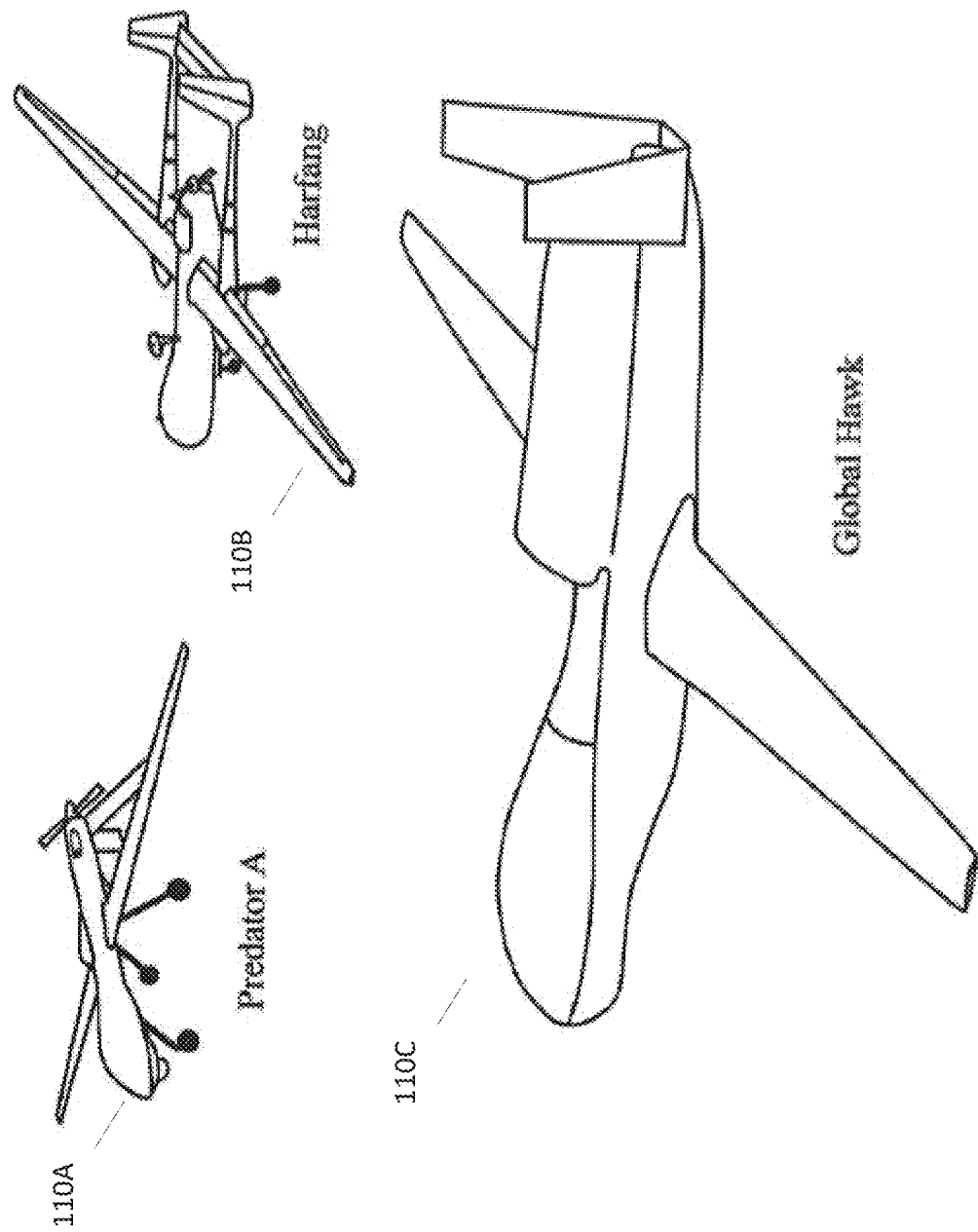
FIG. 1C depicts some schematic views of unmanned aircraft.

FIG. 1C illustrates some examples UAV (unmanned aerial vehicles). In practice most UAVs are part of a larger UAS (unmanned aircraft system), wherein UAS may also include GPS, ground control, transmissions systems, media collectors, software, etc. Often UAS is controlled by a person or a team on the ground or in another vehicle. The travelling object can be any flying or propelled device (e.g. a missile, shuttle, glider, etc.). FIG. 1C illustrates some specific examples of travelling objects including the Predator A 110A, Harfang 110B, and Global Hawk 110C.

The media collector may be a camera, webcam, smartphone, point and shoot camera, satellite camera, lidar system, video camera, or other electronic device configured to capture and save light with an optic sensor. The media collector may capture visual media files such as pictures, graphics, optic sensor data, videos, video frames, etc. The computer may be a server, laptop, desktop, smartphone, wearable, or other type of computing device. The computer may include a processor, system memory, tangible computer readable storage media, communications circuitry or logic, graphics processor, and a display. The tangible computer readable storage media may store, in a non-transitory manner, instructions for programming or causing the processor of the computer to perform a sequence of steps or instructions. In some configurations, the media collector may include the computer itself, or the media collector and the computer may be separate device. For example, a drone may comprise a media collector with an onboard computer. The computer may be a part of the media collector's circuitry. Or the computer might be a server on the ground, e.g. in an office building. The drone's media collector might stay in communication with the computer with communication circuitry or logic. There may be a delay between when the media collector captures the optic sensor information and when the computer receives the optic sensor information (e.g. the visual media file).

The system may include a visual media classifier 130 configured to determine whether the received visual media file has elements in common with previously captured visual media files featuring a vortex generated by a travelling object.

The system may comprise a light source 135 configured to shine light in the region of the air. The light source may comprise a high number of lumens (e.g. a photo bomb.) The presence of the additional light photons may aid the media collector, computer, and/or graphic recognition algorithm in seeing or detecting the presence of the vortex. The visual media classifier 130 may be configured to generate a similarity value 140 based on how many elements the visual media file has with previously captured and identified travelling object vortices. The visual media classifier 130 may be configured to generate a similarity value 140 based on how similar the elements in the visual media file are to previously captured and identified travelling object vortices.

The system may comprise flight plan logic 145. The flight plan logic may be configured to receive a flight plan 150 from a flight computer 155. A flight plan 150 may be stored using a data structure such as a table or list of information. The flight plan may comprise a plurality of rows and columns of data. The flight plan may comprise a header row. The flight plan may also comprise only a single row or column of data.

The flight plan logic 145 may be configured to determine whether the travelling object is on a registered flight plan. A flight plan may include a flight number, a flight departure area, flight path, flight time, and other information relating to the travelling object and route the plan is scheduled to take or has already completed. For example, the flight plan may include a global position system (GPS) data points or IMU (inertial measurement unit). The computer may be configured to trigger an alarm if: the vortex comparison engine determines the visual media file contains a vortex; and the travelling object is not on a registered flight plan.

Table 1 depicts an exemplary flight plan. In this example, there are five columns of data: a Flight ID (an identifier of a travelling object), a Flight Time (departure time), a Date (departure date), Flight Path (a course and speed for the flight), and a validated flight (a yes/no field that a flight checker, in some embodiments, can save data into to record whether the flight is authorized or approved.)

TABLE 1

| Flight ID | Flight Time | Date | Flight Path | Validated Flight |
| --- | --- | --- | --- | --- |
| 0101 | 6 AM | March 19, 1980 | Flight Path 1 | Approved |
| 0102 | 10 AM | March 21, 1980 | Flight Path 2 | Unapproved |
| 0103 | 2 PM | March 25, 1980 | Flight Path 3 | Approved |

Figure 2:
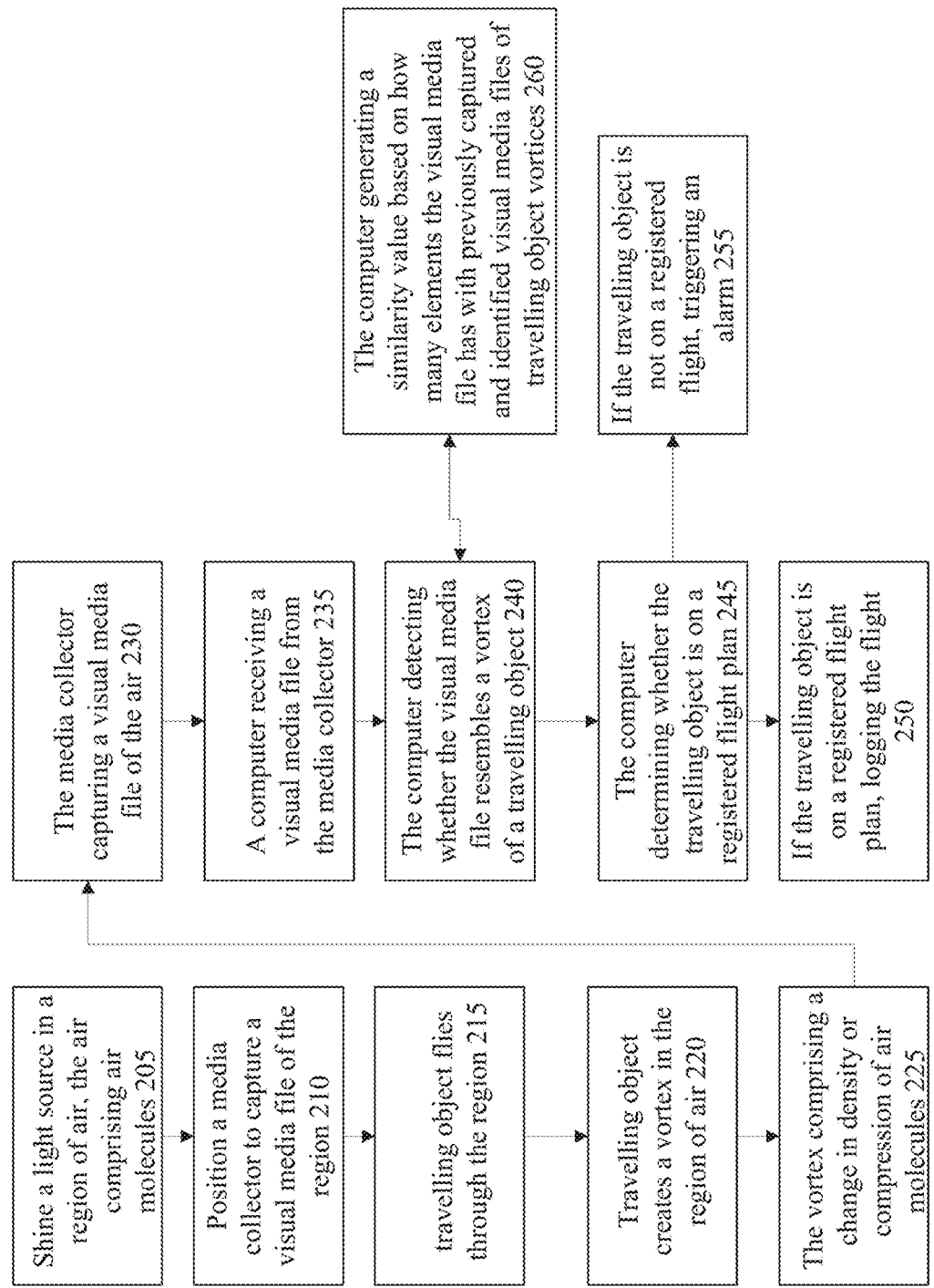
FIG. 2 depicts a flowchart of a method of detecting whether a visual media file has elements in common with a vortex generated by a travelling object.

FIG. 2 depicts a flowchart illustrating a method 200 for detecting a travelling object 240 flying through a region of air 215. The travelling object may create a vortex in the region of air 220. The vortex potentially formed by a change in density or compression of air molecules 225. The method 200 may include positioning a media collector 210 to capture a region of the air containing air molecules, capturing a visual media file 230 of the region of the air, and receiving the visual media file with a computer 235. The computer may be programmed to detect 240 whether the visual media file has elements in common with a vortex generated by a travelling object.

The method may comprise shining a light source 205 in the region of the air. The light source may be a flashlight, a search light, a laser, or other device capable of emitting a beam of photons in an area. The light source may be naturally occurring such as a reflection. The light source may be the sun or the moon.

The method may comprise generating a similarity value 245 based on how many elements the visual media file has with previously captured and identified visual media files of travelling object vortices. Additionally, the method may comprise generating a similarity value based on how similar the elements in the visual media file are to previously captured and identified visual media files of travelling object vortices.

The method may comprise determining whether the travelling object is on a registered flight plan 250. The method may include logging the flight if the travelling object is on a registered flight plan 255. The method may include triggering an alarm if the visual media file is identified to be a vortex and the travelling object is not on the registered flight plan 260.

Figure 3:
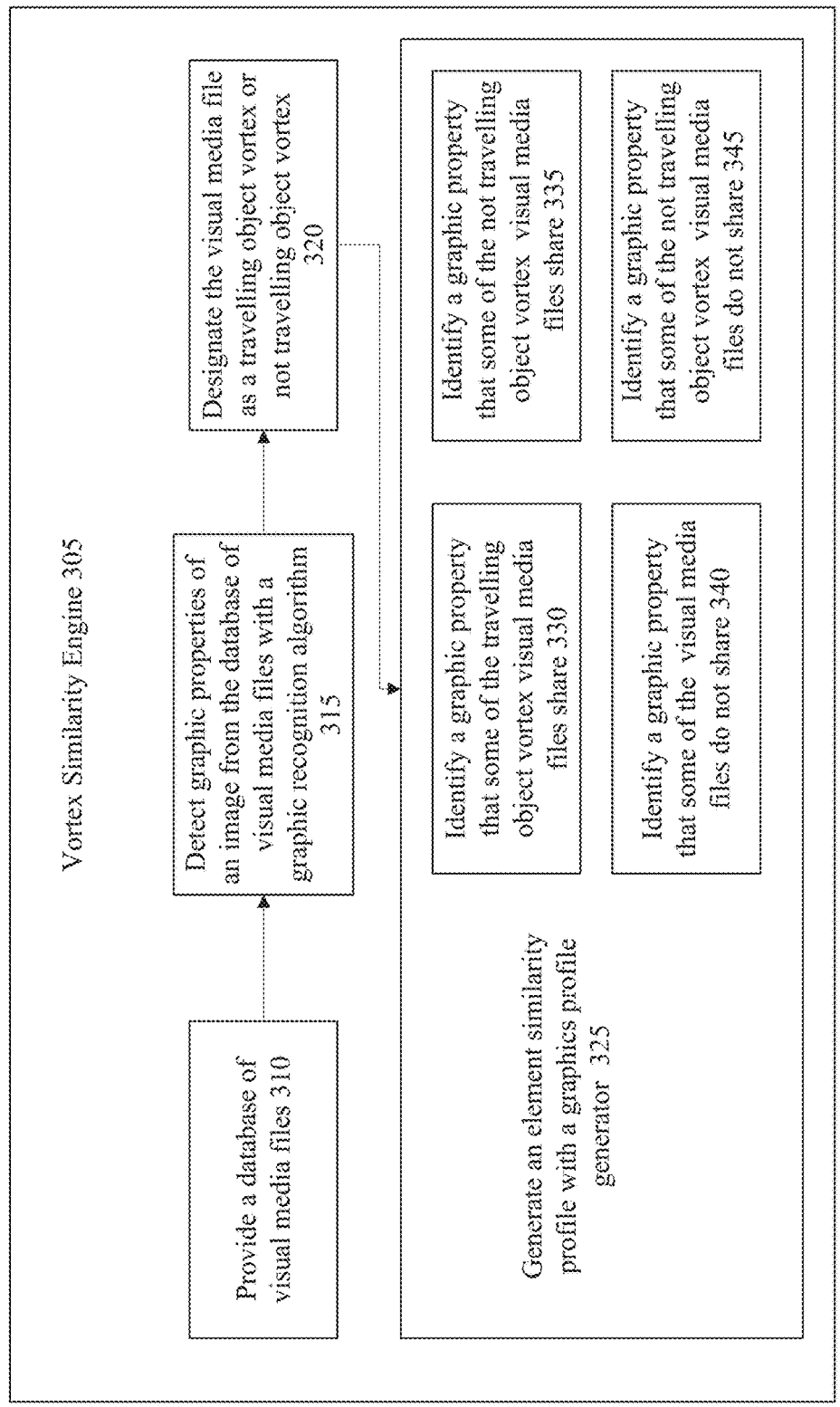
FIG. 3 depicts a schematic diagram of a vortex similarity engine.

FIG. 3 depicts a method 300 of generating a similarity profile 325 using a vortex similarity engine 305. As shown, the embodiment of FIG. 3 depicts a method of providing a database of visual media files 310. The database may be contained in a computer or a server. It may also be connected to other processing devices. In the example of FIG. 3, the vortex similarity engine comprises the database. The vortex similarity engine itself may be embodied as a code executable code non-transitorily stored on computer readable media. A processor may execute that code to generate an instance of the vortex similarity engine (e.g. run or execute the engine.) The engine may also be embodied as circuitry, logic, or other hardware components.

The method shown in FIG. 3 also depicts detecting graphic properties of an image from the database of visual media files with a graphic recognition algorithm 315. The method may include designating the visual media file as a travelling object vortex visual media file if the visual media file depicts a travelling object vortex 320. The method 300 may also include designating the visual media file as not travelling object vortex visual media file if the visual media file does not contain a travelling object vortex. The method may involve identifying a graphic property that some of the travelling object vortex visual media file share; and generating an element similarity profile based on one or more graphic elements identified by the graphic recognition algorithm.

In some embodiments, a graphic property relates to a feature, element or characteristic of the visual media file that can be recognized, generated, and/or captured by a graphics recognition algorithm. The graphics recognition algorithm may be run by a general processor (like a CPU) or by a specialty graphics processor. Information captured by an optic capturing device (e.g. a media collector) may have many graphic properties. The graphic recognition algorithm may be configured to detect these image properties.

Designation of a visual media file as containing a vortex may be accomplished many ways. Designation may be performed by artificial intelligence (e.g. a vortex designator) or by humans. Visual media files may contain metadata that lists whether the image is of a travelling object or a vortex or such information may be contained in a file name.

In FIG. 3, the step of generating an element similarity profile can be accomplished with 4 steps. In some configurations, only 1, 2, or 3 of these may be used. Additionally, some configurations will repeat these 1-4 steps a plurality of times or include additional steps. The four depicted steps are: identify a graphic property that some of the travelling object vortex visual media files share 330; identify a graphic property that some of the not travelling object vortex visual media files share 335; identify a graphic property that some of the visual media files do not share 340; and identify a graphic property that some of the not travelling object visual media files do not share 345.

TABLE 2

| | Graphic Properties in Common | Graphic Properties Not in Common |
|---|---|---|
| Vortex Media File | | |
| Not Vortex Media File | | |

Table 2 shows an example of a data structure that can hold comparison information of graphic properties that may be common or not common to a vortex media file. As shown in Table 2, the vortex engine can use the graphic profile generator to build a data structure that can be used to analyze whether a visual media file containing an unknown subject more closely resembles other visual media file known to depict a vortex or whether the unknown visual media more closely resembles other media files known not to depict a vortex. Similarly, the element similarity profile can be used to determine whether the unknown visual media file has graphic properties that are not similar to properties in a visual media known to depict a vortex. Further, the element similarity profile can be used to determine whether the unknown visual media file has graphic properties that are not similar to properties in a visual media known to not depict a vortex.

An element similarity profile may be a data structure (like an array or a list) that associates properties (e.g. graphic properties) of the visual media file. The data structure may contain organizational data that identifies, for example, probabilities that a certain graphic element will appear in a visual media file depicting a vortex. The data structure may contain organizational data that identifies, for example, probabilities that a certain graphic element will not appear in a visual media file depicting a vortex. The data structure may contain organizational data that identifies, for example, certain graphic elements that are not relevant to whether a visual media file depicts a vortex.

Figure 4:
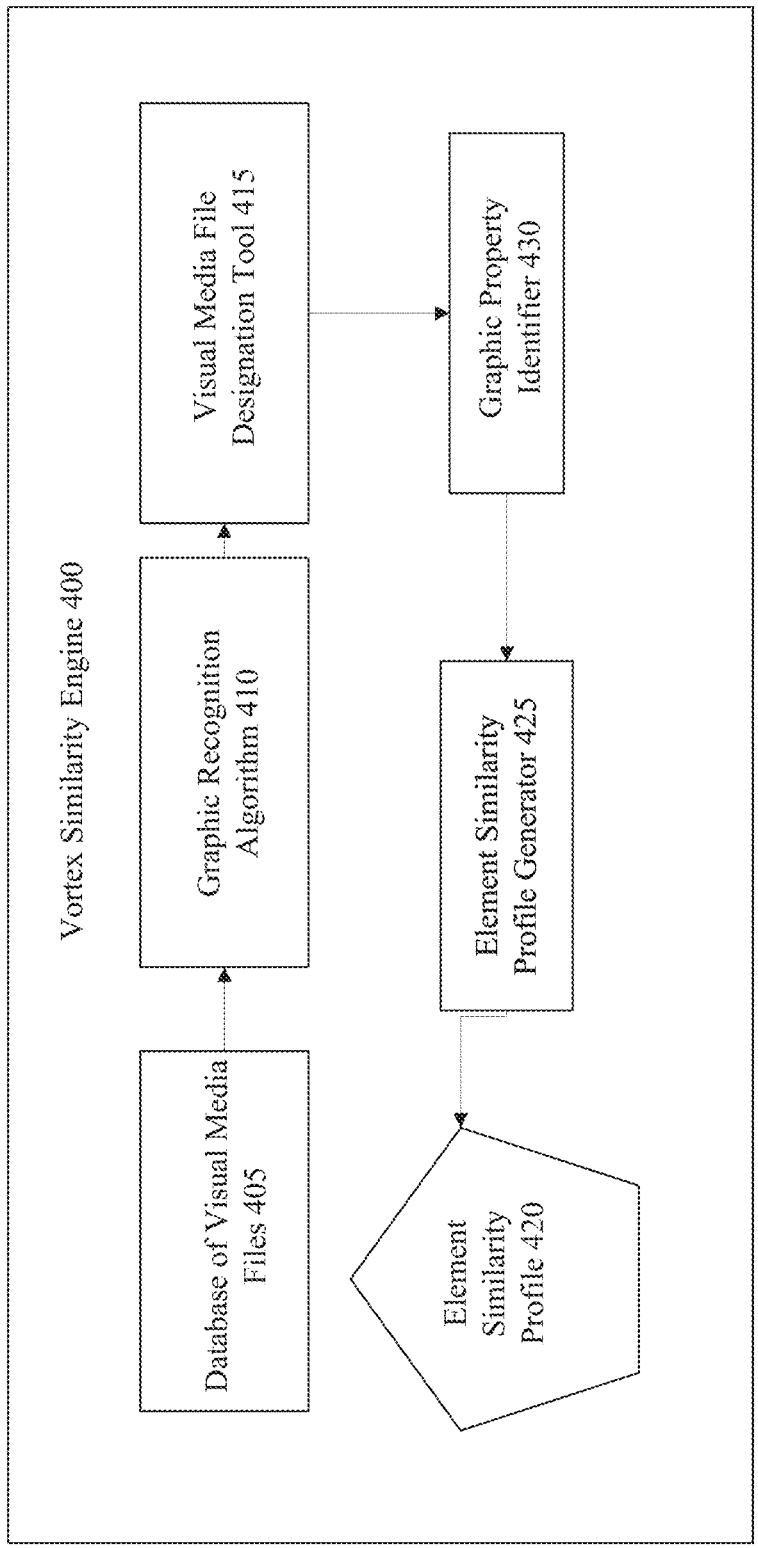
FIG. 4 depicts a flowchart of processes of the vortex similarity engine.

FIG. 4 shows a schematic view of a vortex similarity engine 400. The schematic shows a database of visual media files 405, a graphic recognition algorithm 410, a visual media file designation tool 415, a graphic property identifier 420, an element similarity profile generator 425, and an element similarity profile 430. The graphics recognition algorithm may be configured to generate graphic elements based on characteristics of the images from the database. The visual media file designation tool may be configured to designate the visual media files as a travelling object vortex image if the image depicts a travelling object vortex. The visual media file designation tool 415 may be configured to designate the image as not travelling object vortex image if the image does not depict a travelling object vortex. The graphic property identifier 420 may be configured to identify a graphic property that some of the travelling object vortex images share. The element similarity profile generator 425 may be configured to generate an element similarity profile 430 based on one or more graphic elements identified by the graphic property identifier 420.

Figure 5:
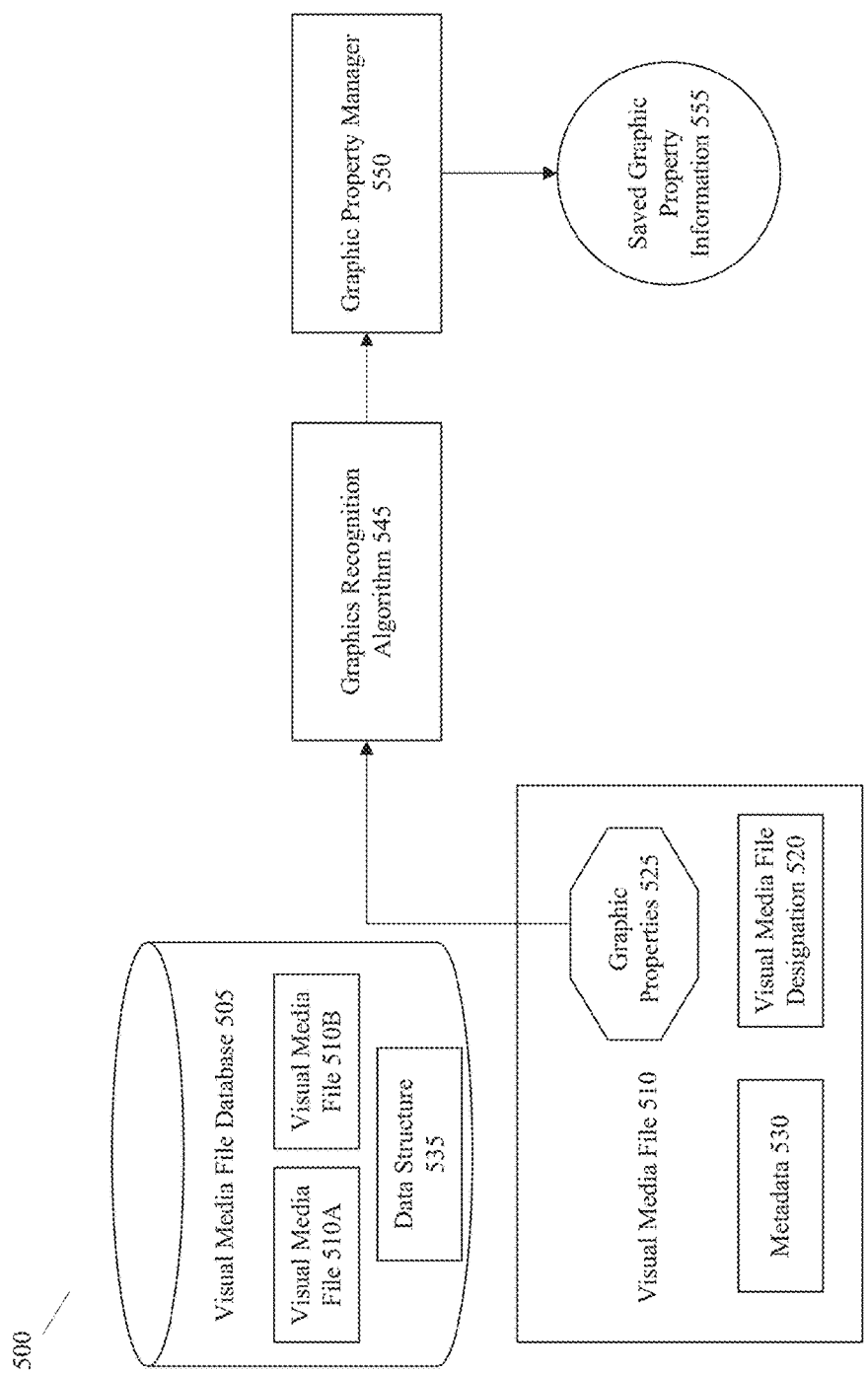
FIG. 5 is a schematic diagram of a graphic recognition algorithm and graphic property manager.
Figure 6:
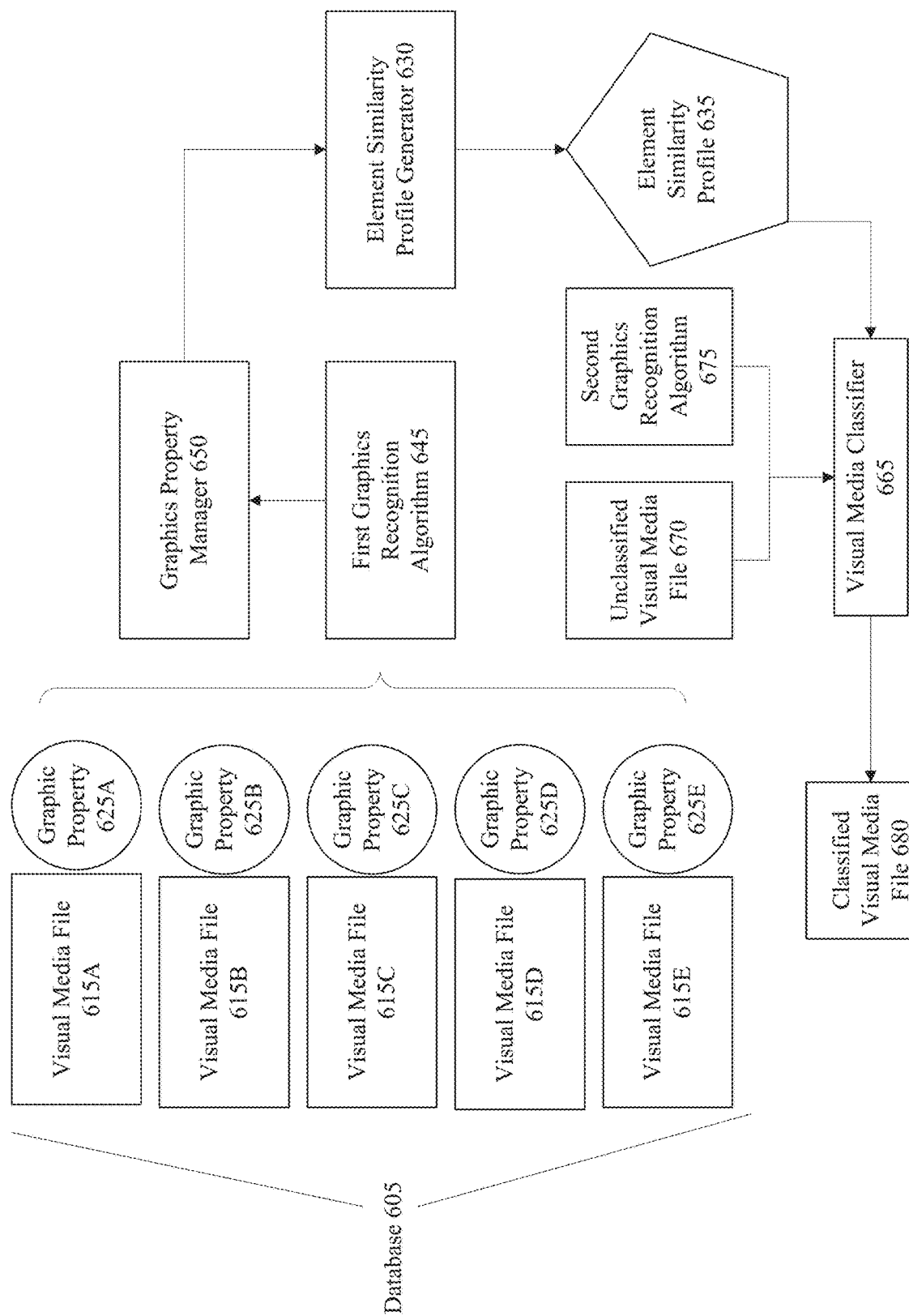
FIG. 6 also depicts a schematic diagram of the graphic recognition algorithm and graphic property manager. The figure depicts processing multiple visual media files and classifying an unknown visual media file.

FIGS. 5 and 6 depict a method and system 500 for determining whether an unclassified visual media file 670 depicts a vortex. Some configurations comprise providing a visual media file database 505 comprising a first visual media file 510A and second visual media file 510B. In some configurations, the database 505 will comprise many visual media files. FIG. 6 shows media files 615A-615E for example stores in a database 605. Each of the visual media files may have graphic properties 525. The visual media file 510 may contain metadata 530 which indicates whether the visual media file depicts a vortex or not. The metadata may comprise a visual media file designation to designate whether the visual media file depicts a vortex. In some configurations, the database 505 will contain a data structure 535 for storing a label documenting the identification of the visual media file as depicting a vortex or not depicting vortex. The method may include determining a first graphic property 625A of the first visual media file 615A with a graphic recognition algorithm 645; and determining a second graphic property 625B of the second visual media file 615B with the graphic recognition algorithm 645. The method may contain saving the first graphic property and second graphic property with a graphic property manager 550. FIG. 5 shows the graphic property manager 550 saving the graphics property as saved graphic property information 555. Some configurations include requesting or getting the first and second graphic property of the visual media file with a graphic property manager 550. The graphics property manager 550 may submit queries to the database 505 to obtain the graphic property information or it may read the graphic property information from the metadata for example.

In FIG. 6, an element similarity profile generator 660 may take the graphic property information 555 saved by the graphic property manager 650 to construct an element similarity profile 635. The method may include providing a visual media classifier 665 configured to process an unclassified visual media file 670. A second instance of a graphic recognition algorithm 675 (or it could be the same graphics recognition algorithm in some embodiments) may be used to analyze the unclassified media file 670 to determine one or more graphic properties of the unclassified visual media file. The visual media classifier 665 may create a classified visual media file 680 by classifying the visual media file as depicting or not depicting a vortex by processing the graphic properties from the second graphic recognition algorithm and element similarity profile.

The system of FIGS. 5-6 depicts a visual media file database comprising a first visual media file 510A and second visual media file 51B. The database may comprise many visual media files. The system may include a first graphics recognition algorithm 645 configured to determine: a first graphic property 625A of the first visual media file 615A; a second graphic property 625B of the second visual media file 615B; and a third graphic property 625C of the unclassified visual media file 615C. In other configurations, multiple graphic recognition algorithms or instances of the graphic recognition algorithm may be used. The system may comprise a graphic property manager 650 configured to save the first graphic property and second graphic property. In some configurations, the graphic recognition algorithm 645 can perform saving operations as well. The system may include an element similarity profile generator 630 configured to generate an element similarity profile 635. The system may contain a visual media classifier 665 configured to classify the unclassified visual media file as depicting or not depicting a vortex by using the element similarity profile and the third graphic property of the unclassified visual media file 680. In effect, the system uses the element similarity profile 635 and graphic property extracted from the unclassified visual media file to classify the visual media as depicting or not depicting a travelling object vortex. In some cases, the visual media classifier 665 will assign a probability that an unclassified visual media depicts or does not depict a vortex.

Figure 7:
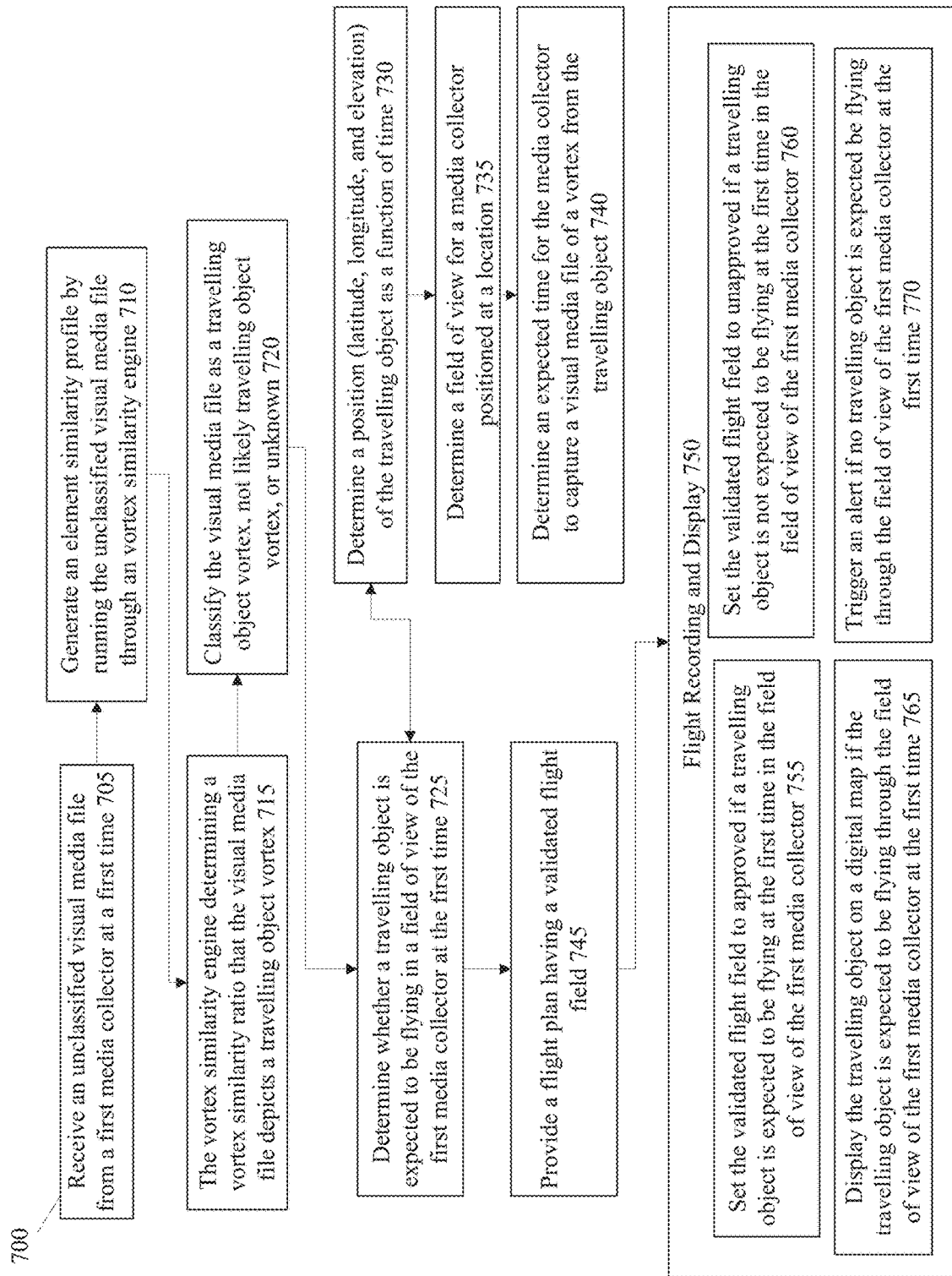
FIG. 7 depicts a flowchart of a process of determining whether a travelling object is expected to be flying in the field of view of a media collector.

FIG. 7 shows an exemplary method 700 according to an aspect of the present application. FIG. 7 shows a method of detecting a travelling object travelling through air. FIG. 7 shows receiving an unclassified visual media file 705 from a first media collector at a first time; the first media collector having a field of view. A field of view is the region that the media collector can "see." E.g. what is in the "frame" of the media collectors field of view. The figure depicts generating an element similarity profile 710 by running the unclassified visual media file through a vortex similarity engine. The vortex similarity engine may be configured to determine 715 a vortex similarity ratio that the visual media file contains an image of a travelling object vortex. In some configurations, the method includes classifying the visual media file 720 as a travelling object vortex or not travelling object vortex. In some configurations, the method may include determining whether a travelling object is expected to be flying through the field of view of the first media collector at the first time 725. Some configurations may include the steps of determining a travelling object's position as a function of time 730 (e.g. longitude, latitude, elevation), determining the media collector's field of view 735, determining an expected time for the media collectors to capture a visual media file of a vortex of the travelling object 740. The position of the travelling object may be determined via GPS, trip planning, LIDAR, communication with the travelling object, or other techniques.

The method shown in FIG. 7 optionally includes providing a flight plan 745. A flight plan may include one or more of the features from Table 1. In the configuration of FIG. 7, the flight plan may be displayed with a flight recording and display 750. The flight plan optionally includes at least a validated flight field. The method may include setting the validated flight field to approved if a travelling object is expected to be flying at the first time in the field of view of the first media collector 755. The method may include setting the validated flight field to unapproved if a travelling object is not expected to be flying at the first time in the field of view of the first media collector 760. The method may include displaying the travelling object on a digital map if the travelling object is expected to be flying through the field of view of the first media collector at the first time 765. The method may include triggering an alert if no travelling object is expected be flying through the field of view of the first media collector at the first time 770.

Figure 8:
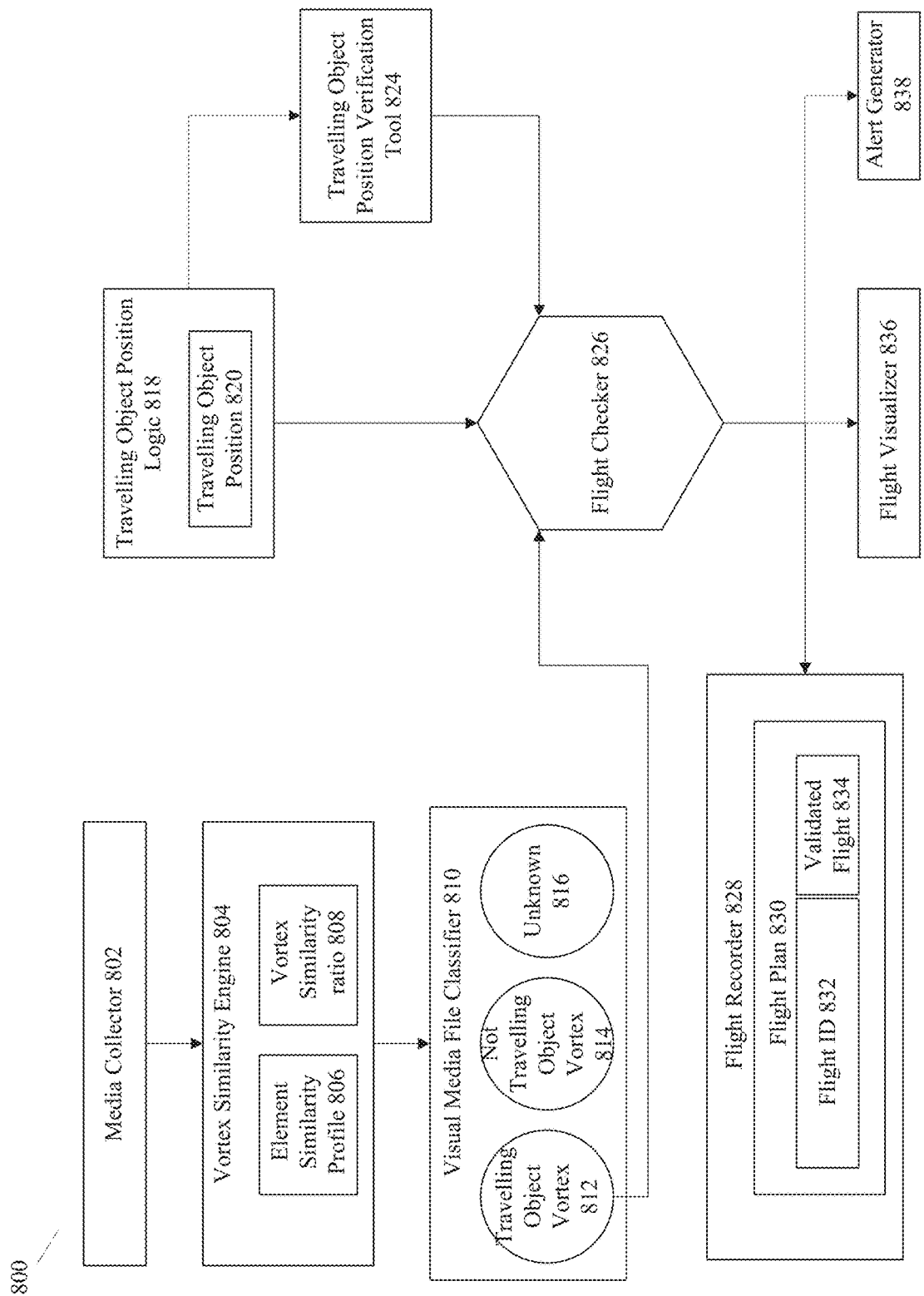
FIG. 8 is a schematic diagram of a flight checker and flight visualizer.

FIG. 8 shows a schematic diagram of a system 800 for detecting a travelling object travelling through air. FIG. 8 depicts a vortex similarity engine 804 configured to receive an unclassified visual media file from a media collector 802. The vortex similarity engine may be configured to generate an element similarity profile 806 and/or a vortex similarity ratio 808. The system may comprise a visual media file classifier 810 configured to classify the unclassified visual media file as a travelling object vortex 812, not travelling object vortex 814, or unknown 816. A flight checker 826 may receive the classification data from the visual media file classifier 810. Position logic 818 may be configured to determine a position of the travelling object 820 and provide that position information to the flight checker 826. The position logic 818 may be configured to receive a transmission containing GPS information relating to a position of the travelling object. A travelling object position verification tool 824 may be configured to determine whether the travelling object is expected to be in the position determined by the travelling object position logic 818 or GPS receiver.

The flight checker 826 may comprise or be connected to a flight recorder 828 for saving or accessing a flight plan 830 comprising a plurality of rows of data. The flight plan 830 may comprise a flight ID 832 and validated flight field 834. The flight checker 826 may be configured to set the validated flight field 834 to: approved if a travelling object is expected to be flying at the first time in the field of view of the first media collector; and unapproved if a travelling object is not expected to be flying at the first time in the field of view of the first media collector.

The flight checker 826 may comprise or be connected to a flight visualizer 836 configured to display the travelling object on a digital map if the travelling object is expected to be flying through the field of view of the first media collector at the first time. The flight checker may comprise or be connected to an alert generator 838 configured to trigger an alert if no travelling object is expected be flying through the field of view of the first media collector at the first time.

Figure 9:
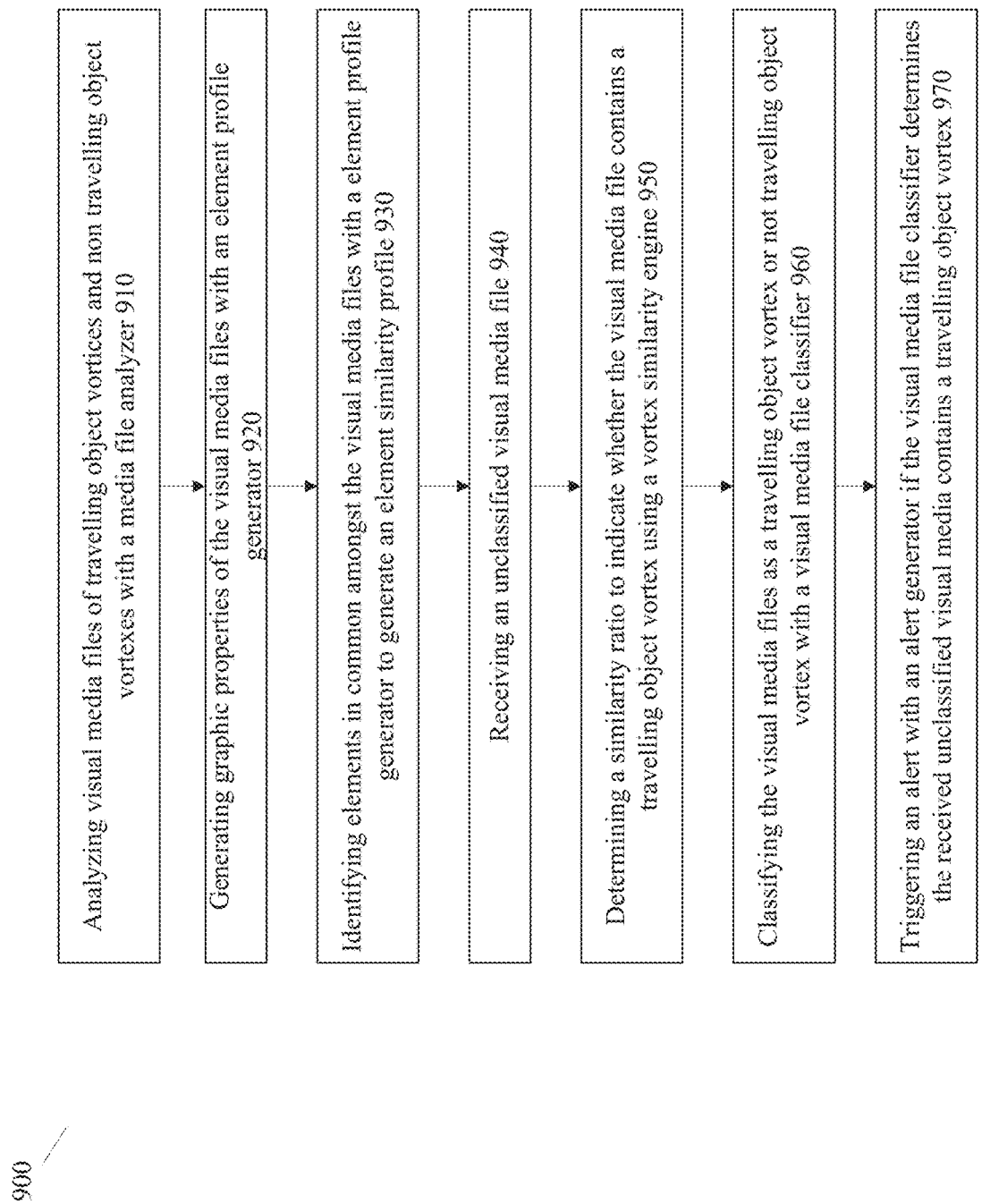
FIG. 9 depicts a flowchart of a process of determining a similarity ratio to indicate whether a visual media file contains a travelling object vortex using a vortex similarity engine.

FIG. 9 illustrates a method 900 of analyzing visual media file of travelling object vortices with a media file analyzer 910. The method may include generating graphic elements of the visual media files with a graphic recognition algorithm 920. The method may include identifying an element in common amongst the visual media files with an element profile generator to generate an element similarity profile 930. The method may include receiving an unclassified visual media file 940. The method may involve calculating a vortex similarity ratio with a vortex similarity engine to indicate whether the visual media file depicts a vortex made by a travelling object vortex 950. The method may include classifying the visual media files as a travelling object vortex or not a travelling object vortex or unknown. Classification may be performed by a visual media file classifier 960. The system may trigger an alert with an alert generating if the visual media file classifier determines the receive unclassified visual media contains a travelling object vortex 970.

Figure 10:
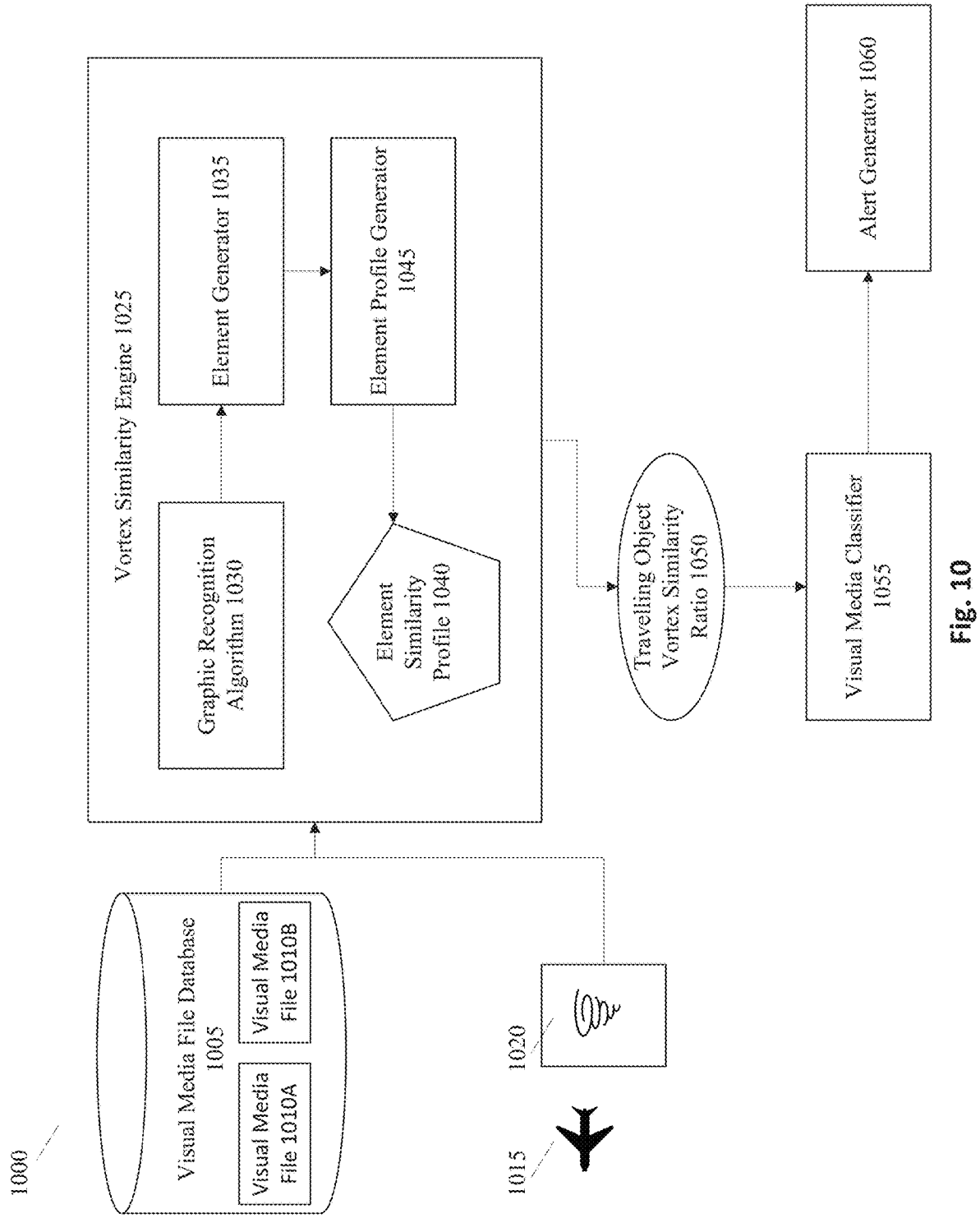
FIG. 10 is a schematic diagram of the vortex similarity engine using an element similarity profile to generate a travelling object vortex similarity ratio.

FIG. 10 shows a schematic diagram according to an aspect of the prevent invention. The system 1000 depicts a graphic recognition algorithm 1030 configured to analyze a first visual media file 1010A and a second visual media file 1010B. The media files may depict a travelling object vortex 1020 made by a travelling object 1015 or not a travelling object vortex. The system may include a vortex similarity engine 1025 comprising a graphic recognition algorithm 1030 configured to analyze the visual media files. An element generator 1035 may create graphic elements from the visual media file. The vortex similarity engine may comprise or be connected to a visual media file database 1005 optionally containing visual media file A, visual media B, and potentially more visual media files. The vortex similarity engine 1025 may include an element profile generator 1045 configured to identify an element in common amongst the visual media files and generate an element similarity profile 1040. The vortex similarity engine may be configured to receive an unclassified visual media file; compare the unclassified visual media file with the element similarity profile; and determine a travelling object vortex similarity ratio 1050 to indicate whether the visual media file depicts a travelling object vortex. The system may include a visual media classifier 1055 configured to classify the visual media files as a travelling object vortex or not travelling object vortex based on the travelling object cortex similarity ratio of the visual media file. The system may include an alert generator configured to generate an alert 1060 if the visual media file classifier determines the received unclassified visual media contains a travelling object vortex.

Figure 11:
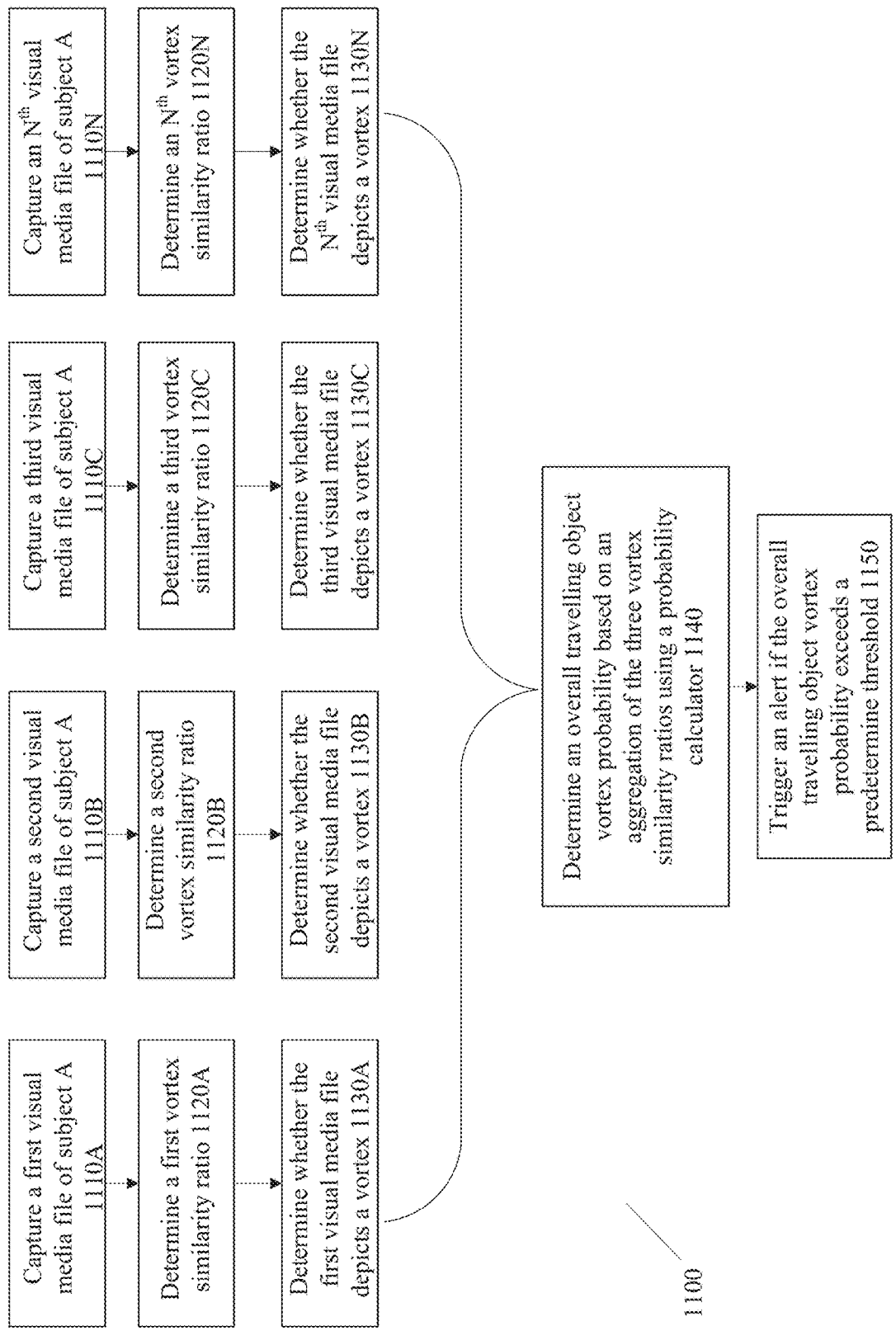
FIG. 11 depicts a flowchart of a process of determining an overall travelling object vortex probability based on an aggregation of N similarity ratios using a probability calculator.
Figure 12:
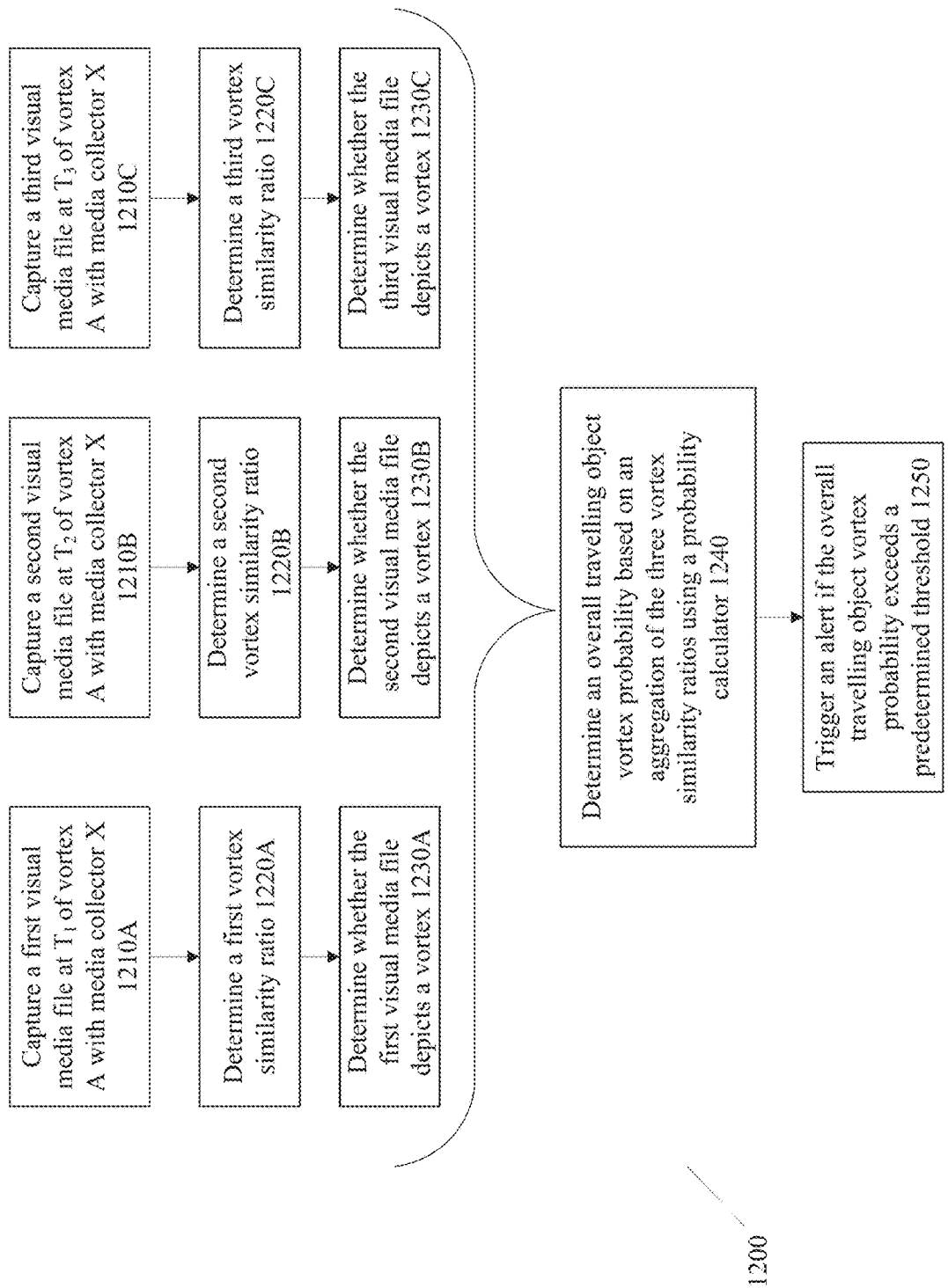
FIG. 12 depicts a flowchart of a process of determining an overall travelling object vortex probability based on an aggregation of the three vortex similarity ratios based on visual media files taken at different times.
Figure 13:
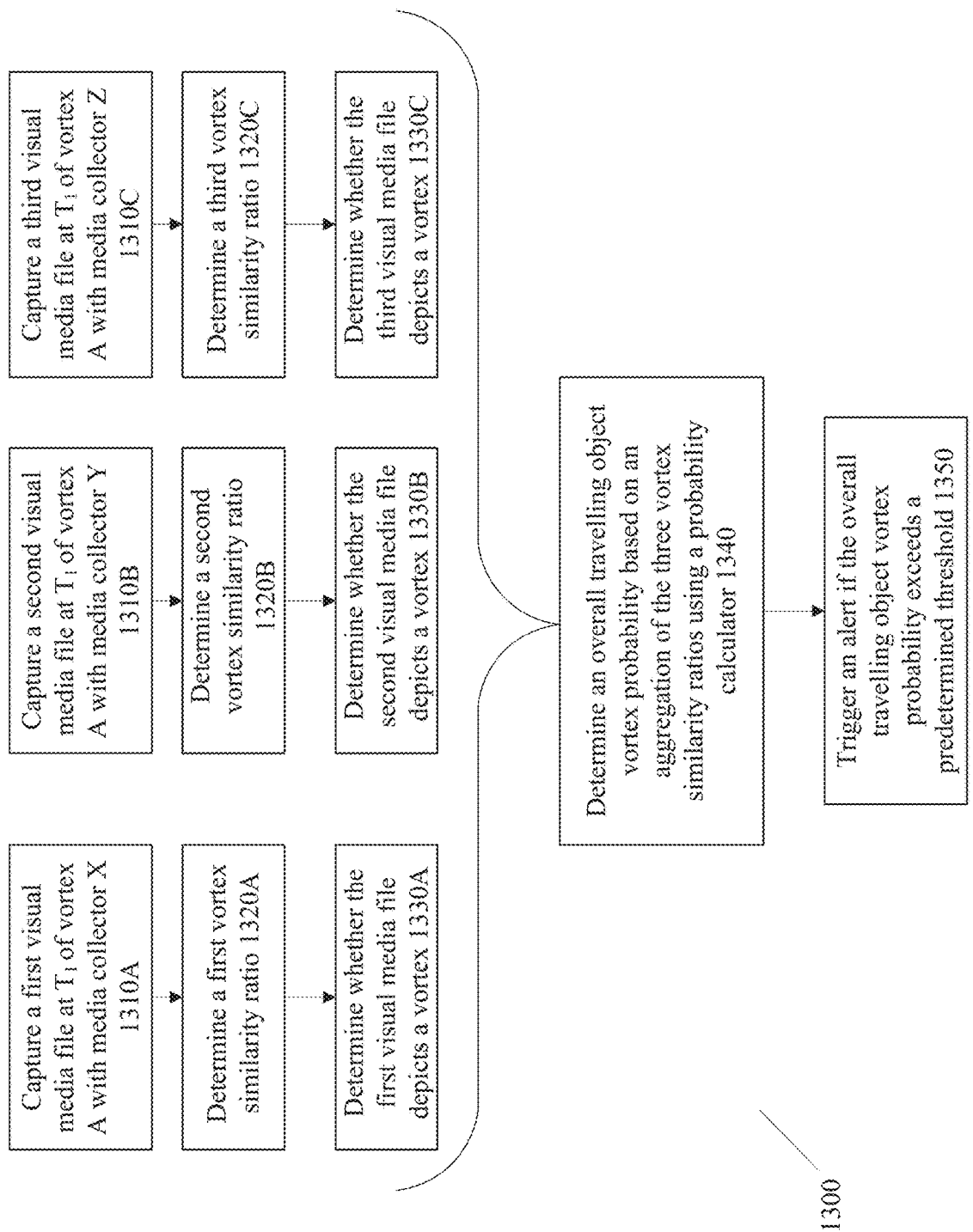
FIG. 13 depicts a flowchart of a process of determining an overall travelling object vortex probability based on an aggregation of the three vortex similarity ratios based on visual media files taken with different media collectors.

FIGS. 11-13 shows a flowchart of a method according to an aspect of the present invention. The method may include capturing a first, second, third, and $N^{th}$ visual media of a subject (1110A-1110N). Subject meaning an object in the frame of the field of view of the media collector such as a travelling object, airborne object, travelling object, etc. The method may involve determining a vortex similarity ratio with the vortex similarity engine to indicate whether each of the visual media files contain a vortex by a travelling object (1120A-1120N). The method may include analyzing the visual media files with the vortex similarity engine to determine whether each of the visual media files depict a travelling object vortex (1130A-1130N). The method may include determining an overall travelling object vortex probability based on an aggregation of the three vortex similarity ratios using a probability calculator 1140. The method optionally includes triggering an alert if the overall craft vortex probability exceeds a predetermined threshold 1150.

The method 1100 may include verifying that the three visual media files depict the same subject using a media file identity verification tool. The method may include the step of triggering an alert if a majority of the visual media files analyzed by the vortex similarity engine have a vortex similarity ratio above a threshold value. The method may be configured wherein the first, second, and third media files are captured at different times, but still depict a single, same subject. The method may be configured wherein the first, second, and third media files are captured at different times, and all depict a travelling object vortex made by one travelling object.

Method 1200 may be configured wherein the first visual media file is captured at a first time 1210A; the second visual media file is captured at the first time 1210B; the third visual media is captured at the first time 1210C; and the first, second, and third media files are captured by different media collectors. The method may comprise determining a first, second, and third vortex similarity ratio (1220A-1220C) to determine whether the first, second, and third visual media depict a vortex (1230A-1230C). Although only three visual media files are shown in FIG. 12, N number of images could be used in some configurations. The method 1200 may include determining an overall travelling object vortex probability based on an aggregation of the three vortex similarity ratios using a probability calculator 1240. The method optionally includes triggering an alert if the overall travelling object vortex probability exceeds a predetermined threshold 1250.

Method 1300 may be configured wherein the first visual media file is captured by a first media collector; the second visual media file is captured by a second media collector; the third visual media file is captured by a third media collector; and the first, second, and third visual media files are captured at the same time (1310A-1310C). The method may comprise determining a first, second, and third vortex similarity ratio (1320A-1320C) to determine whether the first, second, and third visual media depict a vortex (1330A-1330C). Although only three visual media files are shown in FIG. 13, N number of images could be used in some configurations. The method 1300 may include determining an overall travelling object vortex probability based on an aggregation of the three vortex similarity ratios using a probability calculator 1340. The method optionally includes triggering an alert if the overall travelling object vortex probability exceeds a predetermined threshold 1350.

Figure 14:
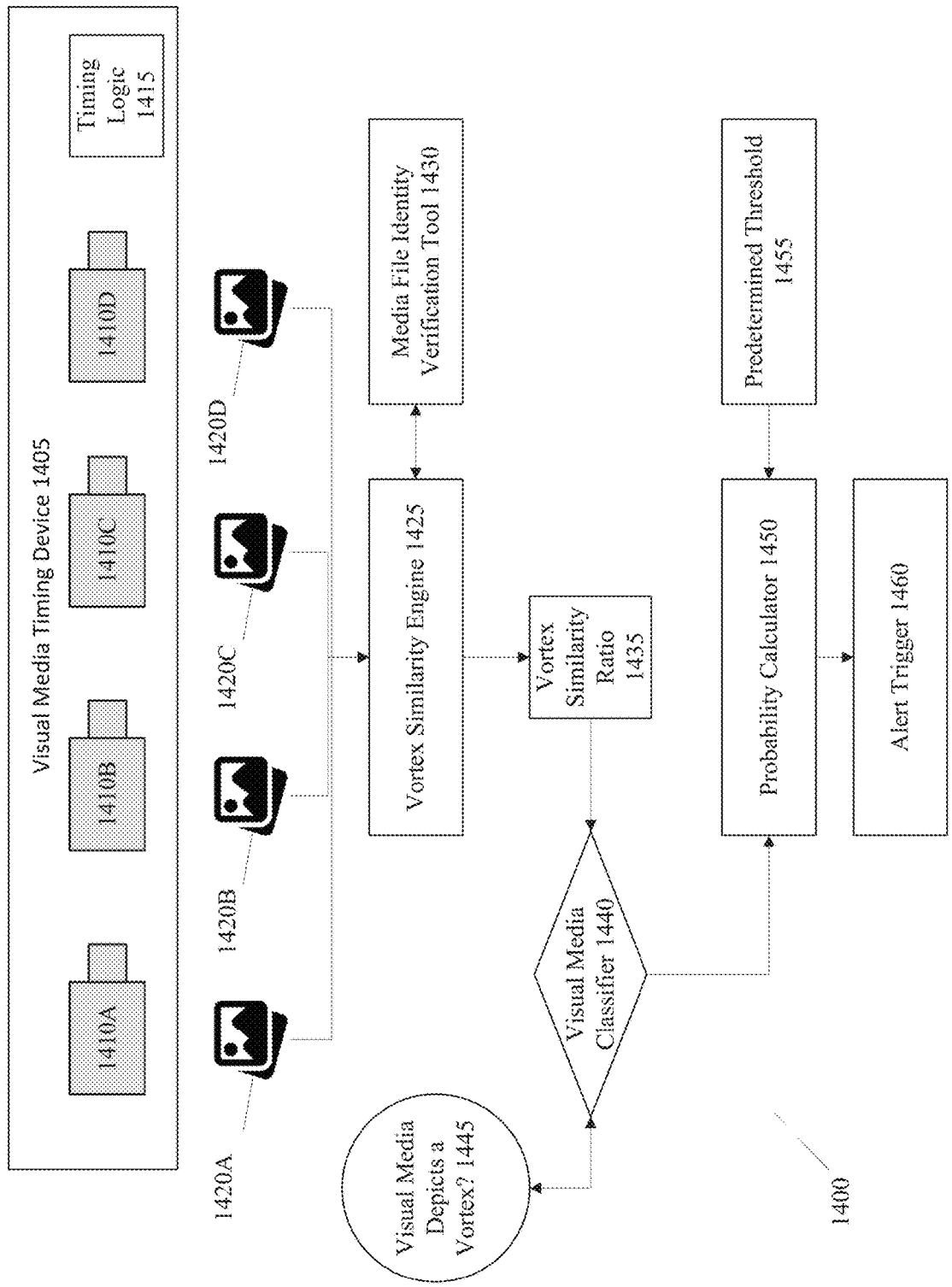
FIG. 14 depicts a schematic diagram of a visual media timing device and visual media classifier.

FIG. 14 illustrates a system 1400 comprising a visual media timing device 1405 configured to capture a first visual media file 1420A of a first subject; a second visual media file 1420B of a second subject; a third visual media file 1420C of a third subject; and a fourth visual media file 1420D of a fourth subject using a plurality of media collectors (1410A, 1410B, 1410C, 1410D). The system may comprise a vortex similarity engine 1425 configured to analyze the visual media files (1420A-1420D) with a visual media classifier 1440 to determine whether each of the visual media files depicts a travelling object vortex. The system 1400 may be configured to determine a vortex similarity ratio 1435 to indicate whether each of the visual media files depict a vortex made by a travelling object 1445. The system may comprise a probability calculator 1450 configured to determine an overall travelling object vortex probability based on an aggregation of the vortex similarity ratios. The system may comprise an alert trigger 1460 configured to trigger an alert if the overall travelling object vortex probability exceeds a predetermined threshold 1455.

The system may comprise a media file identity verification tool 1430 configured to verify whether the three visual media files depict the same subject. The system may comprise an alert trigger 1460 configured to trigger the alert if a majority of the visual media files analyzed by the vortex similarity engine have a vortex similarity ratio above a threshold value.

The visual media timing device 1405 may be configured to capture the visual media files at different times from different field of views. The visual media timing device may comprise: a first media collector configured to capture the first visual media file; a second media collector configured to capture the second visual media file; a $N^{th}$ media collector configured to capture the $N^{th}$ visual media; etc. and timing logic configured to capture the N media files at the same time. Although a one-to-one media collector: visual media file ratio is shown, other configurations are possible. The visual media timing device 1405 may comprise: a first media collector configured to capture the first visual media file; a second media collector configured to capture the second visual media file; an $N^{th}$ media collector configured to capture the $N^{th}$ visual media file; and timing logic to capture the N visual media files at different times.

Figure 15:
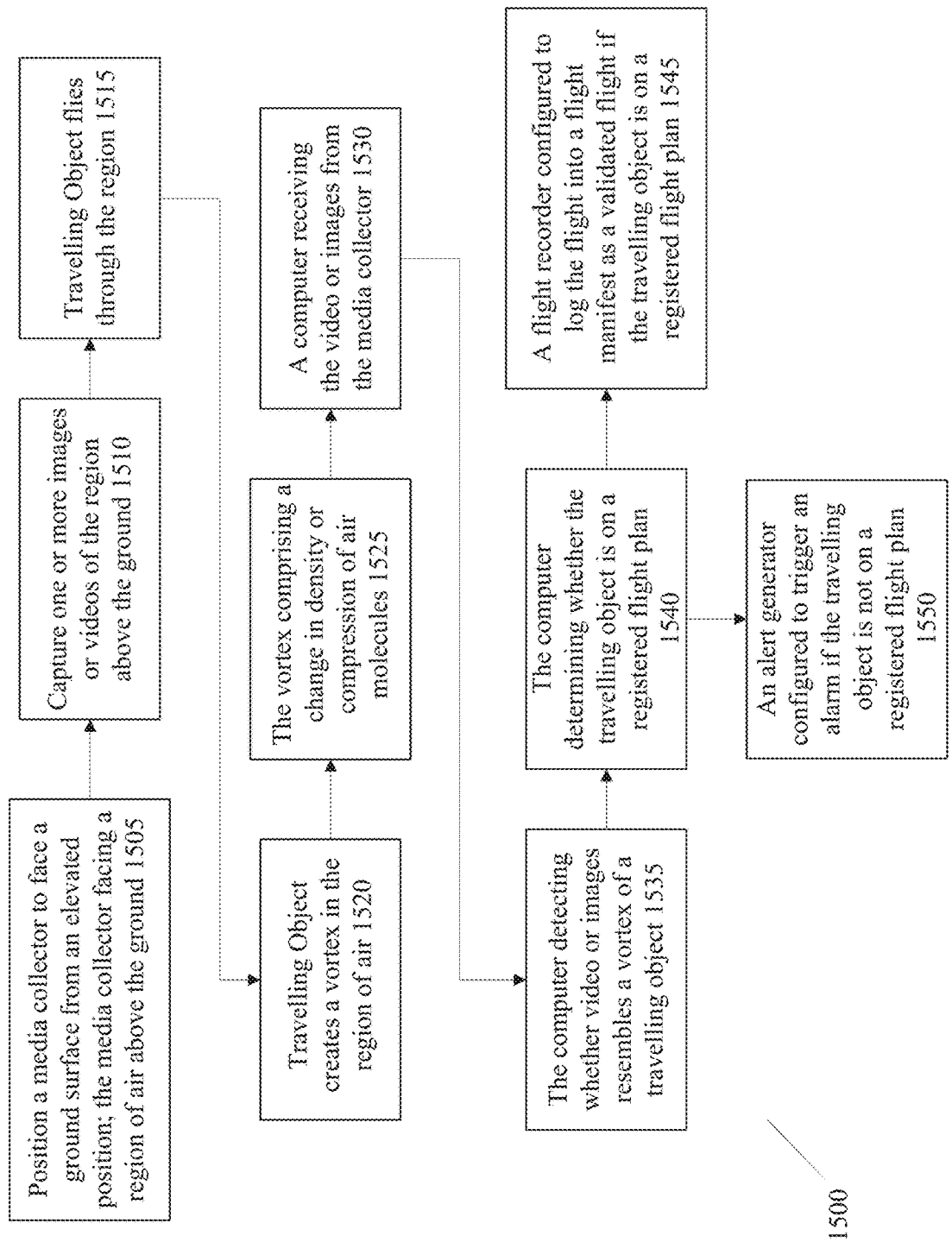
FIG. 15 depicts a flowchart of a computer process for detecting whether video or images resembles a vortex of a travelling object.

FIG. 15 illustrates a flowchart depicting a method 1500 involving capturing a visual media file of a vortex made by a travelling object flying through a region of a media collector's field of view 1515. The travelling object may create a vortex in the region of air 1520. The method may comprise positioning a media collector to face a ground surface 1505 from an elevated position. The media collector may face a region of air above the ground surface. The media collector may capture one or more images or videos of the region above the ground surface 1510. The media collector may receive the images or videos with a computer 1530. The computer may detect whether the images or the videos resemble a vortex of a travelling object 1535; the vortex comprising a change in density of the air or compression of air molecules in the air 1525. The computer may determine whether the travelling object is on a registered flight plan 1540. The computer may trigger an alarm if the travelling object is not on a registered flight plan 1550. The computer may log the flight with a flight recorder into a flight plan as a validated flight if the travelling object is on a registered flight plan 1545.

Figure 16:
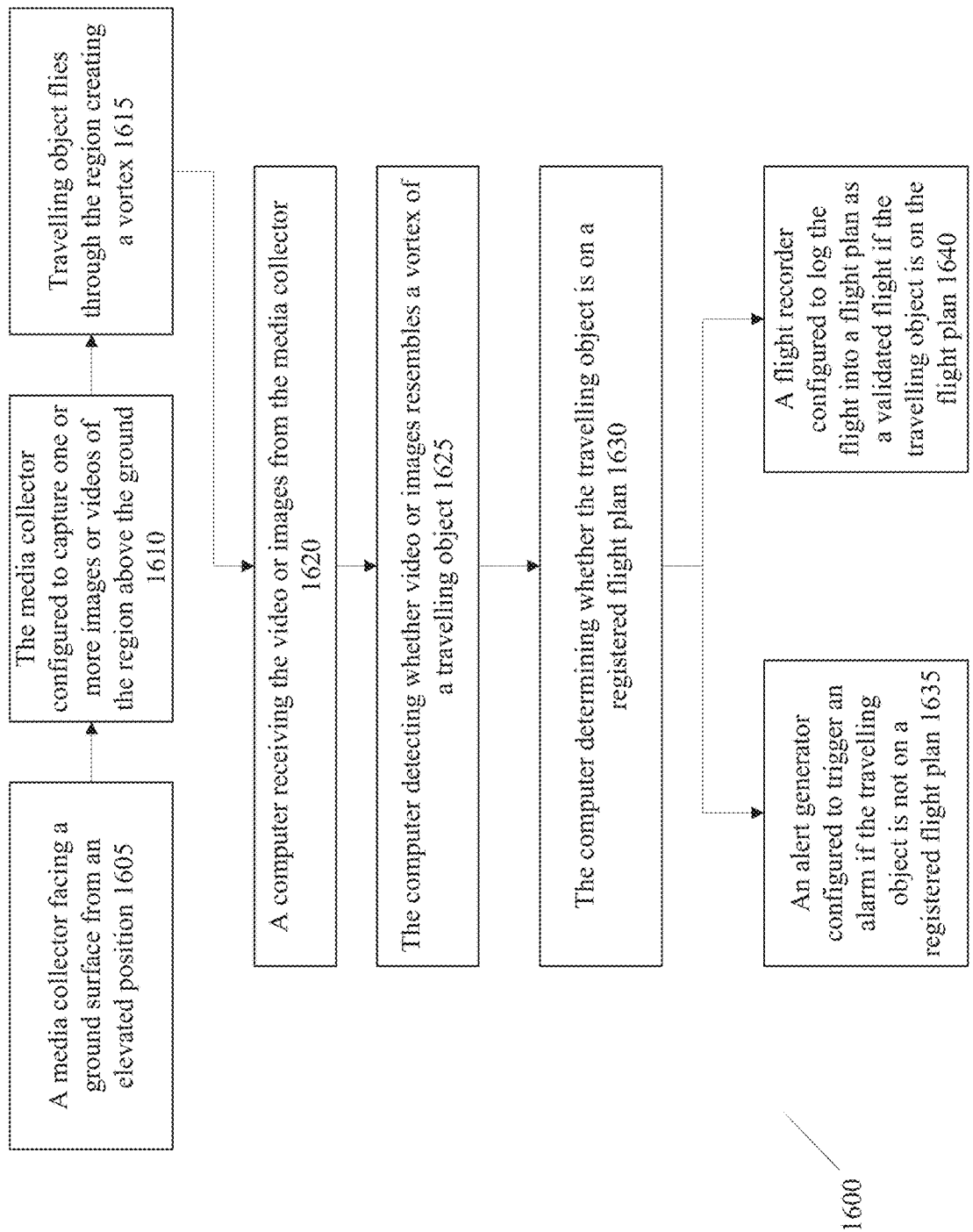
FIG. 16 depicts a schematic diagram of a computer process for detecting whether video or images resembles a vortex of a travelling object and whether that travelling object is a registered flight plan.

FIG. 16 illustrates a schematic of system 1600. The system may comprise a media collector facing a ground surface from an elevated position 1605; wherein the media collector faces a region of air above the ground surface. The media collector may be configured to take a picture or a video of a vortex made by a travelling object flying through the field of view of the media collector. The media collector may be configured to capture one or more images or videos of the region above the ground surface 1610 when a travelling object flies through the region creating a vortex 1615. The system may comprise a computer configured to receive the images or video 1620. The computer may be configured to detect whether the images or the videos resemble a vortex of a travelling object 1625. A vortex may comprise a change in density of the air or compression of air molecules in the air. The computer may determine whether the travelling object is on a registered flight plan 1630. The system may comprise an alert generator configured to trigger an alarm if the travelling object is not on a registered flight plan 1635. The computer may comprise a flight recorder configured to log the flight into a flight manifest as a validated flight if the travelling object is on a registered flight plan 1640.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing system" encompasses all apparatus, devices, and machines for processing data, including by way of example a programmable processor, a computer, or multiple processors or computers. The system may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Embodiments and functional operations described in this specification may be implemented in digital electronic circuitry, or in computer software, firmware, or hardware, including the structures disclosed in this specification and their structural equivalents, or in combinations of one or more of them. For example, elements designated as engines, generators, identifiers, tools, analyzers, calculators, classifiers, checkers, finders, logic recorders, visualizers, aggregators, modules, nodes, managers, organizers, algorithms, etc. may be implemented in a variety of ways. A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide interaction with a user, embodiments may be implemented on a computer having a display device, like a TV or monitor (CRT or LCD, etc.) for displaying information to the user. Computers may have peripherals like a keyboard, trackpad, mouse, etc. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computer and/or computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A method comprising the steps of:
positioning a media collector to face a ground surface from an elevated position; the media collector facing a region of air above the ground surface;
capturing a plurality of visual media files wherein the plurality of visual media files includes at least a first visual media file, second visual media files, and a third visual media; wherein the plurality of visual media files contain imagery of the region of air above the ground surface; wherein some of the visual media files contain a travelling object vortex and some of the visual media files do not contain a travelling object vortex;
receiving the visual media files with a computer;
the computer detecting whether the visual media files resemble a vortex of a travelling object on a flight; the vortex comprising a change in density of air or compression of air molecules in the air;
the computer determining whether the travelling object is on a registered flight plan;
triggering an alarm if the travelling object is not on a registered flight plan; and
logging the flight into a flight plan as a validated flight if the travelling object is on the registered flight plan.

2. A method of claim 1 comprising the steps of:
identifying a graphic property that some of the travelling object vortex visual media files share;
identifying a graphic property that some of the non-travelling object vortex visual media files share;
identifying a graphic property that some of the visual media files do not share; and
identifying a graphic property that some of the non-travelling object visual media files do not share.

3. A method of claim 1 comprising the steps of:
a graphic recognition algorithm generating graphic elements from the visual media files;
identifying an element in common amongst the visual media files;
generating an element similarity profile;
receiving an unclassified visual media file;
comparing the unclassified visual media file with the element similarity profile;
determining a travelling object vortex similarity ratio to indicate whether the visual media files depict a travelling object vortex; and
a visual media file classifier classifying the visual media files as a travelling object vortex or not travelling object vortex based on the travelling object vortex similarity ratio of the visual media file.

4. The method of claim 1 comprising creating graphic elements from the first visual media file.

5. The method of claim 1 comprising:
analyzing the visual media files with a vortex similarity engine; and
triggering an alert if a majority of the visual media files analyzed by the vortex similarity engine have a vortex similarity ratio above a threshold value.

6. The method of claim 1 comprising using a media file identity verification tool to verify that a first, second, and third subject in the first, second, and third visual media files depict a vortex made by one travelling object.

7. The method of claim 1 comprising capturing the first, second, and third media files at different times but of a same subject.

8. The method of claim 1 comprising capturing the first, second, and third media files at different times of one subject depicting a travelling object vortex made by one travelling object.

9. The method of claim 1 comprising:
determining a first, second, and third vortex similarity ratio; and
determining whether the first, second, and third visual media files depict a vortex.

10. The method of claim 9 comprising:
determining an overall travelling object vortex probability based on an aggregation of the first, second, and third vortex similarity ratios using a probability calculator; and
triggering an alert if the overall travelling object vortex probability exceeds a predetermined threshold.

11. The method of claim 10 comprising:
capturing the visual media files at different times; and
determining the overall travelling object vortex probability based on an aggregation of the vortex similarity ratios; the overall travelling object vortex probability being a measurement of a probability that the first, second, and third visual media files depict a travelling object vortex.

12. A system comprising:
a media collector facing a ground surface from an elevated position; the media collector facing a region of air above the ground surface;
a plurality of visual media collectors configured to capture a plurality of visual media files wherein the plurality of visual media files includes at least a first visual media file, second visual media files, and a third visual media file; wherein the plurality of visual media files contain imagery of the region of air above the ground surface; wherein some of the visual media files contain a travelling object vortex and some of the visual media files do not contain a travelling object vortex;
a computer configured to:
receive the visual media files;
detect whether the visual media files resemble a vortex of a travelling object on a flight;
the vortex comprising a change in density of air or compression of air molecules in the air;
determine whether the travelling object is on a registered flight plan;
trigger an alarm if the travelling object is not on a registered flight plan; and
log the flight into a flight plan as a validated flight if the travelling object is on the registered flight plan.

13. The system of claim 12 comprising:
a vortex similarity engine comprising:
a graphic recognition algorithm configured to generate graphic elements from the visual media files;
an element profile generator configured to:
identify an element in common amongst the visual media files; and
generate an element similarity profile by:
identifying a graphic property that some of the travelling object vortex visual media files share;
identifying a graphic property that some of the non-travelling object vortex visual media files share;
identifying a graphic property that some of the visual media files do not share; and
identifying a graphic property that some of the non-travelling object visual media files do not share.

14. The system of claim 12 comprising:
a graphic recognition algorithm generating graphic elements from the visual media files;
an element similarity generator configured to generate an element similarity profile;
a vortex similarity engine configured to:
receive an unclassified visual media file;
compare the unclassified visual media file with the element similarity profile;
determine a travelling object vortex similarity ratio to indicate whether the visual media files depict a travelling object vortex; and
a visual media file classifier configured to classify the visual media files as a travelling object vortex or not travelling object vortex based on the travelling object vortex similarity ratio of the visual media file.

15. The system of claim 12 comprising an element generator configured to create graphic elements from the visual media files.

16. The system of claim 12 comprising:
a vortex similarity engine configured to analyze the visual media files with a vortex similarity engine; and
an alert trigger configured to trigger an alert if a majority of the visual media files analyzed by the vortex similarity engine have a vortex similarity ratio above a threshold value.

17. The system of claim 12 wherein the first, second, and third media files are captured at different times, but still depict a single, same subject.

18. The system of claim 12 wherein the first, second, and third media files are captured at different times, and all depict a travelling object vortex made by one travelling object.

19. The system of claim 12 comprising a vortex similarity engine configured to:
determine a first, second, and third vortex similarity ratio; and
determine whether the first, second, and third visual media files depict a vortex.

20. The system of claim 19 comprising a probability calculator configured to determine an overall travelling object vortex probability based on an aggregation of the first, second and third vortex similarity ratios; the overall travelling object vortex probability being a measurement of a probability that the first, second, and third visual media files depict a travelling object vortex.

21. The system of claim 20 comprising an alert trigger configure to generate an alert when the overall travelling object vortex probability exceeds a predetermined threshold.

* * * * *